July 25, 1967 M. A. HALLING 3,332,642
SUMMIT SENSING GUIDANCE INITIATION DEVICE
Filed July 28, 1965 3 Sheets-Sheet 1
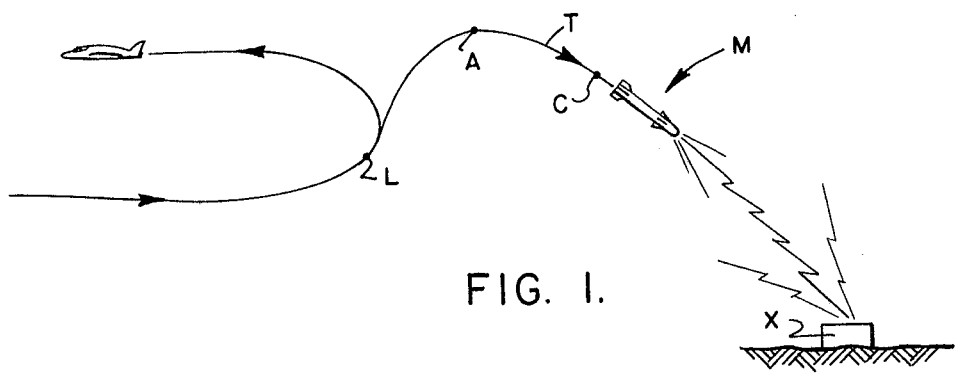
FIG. 1.
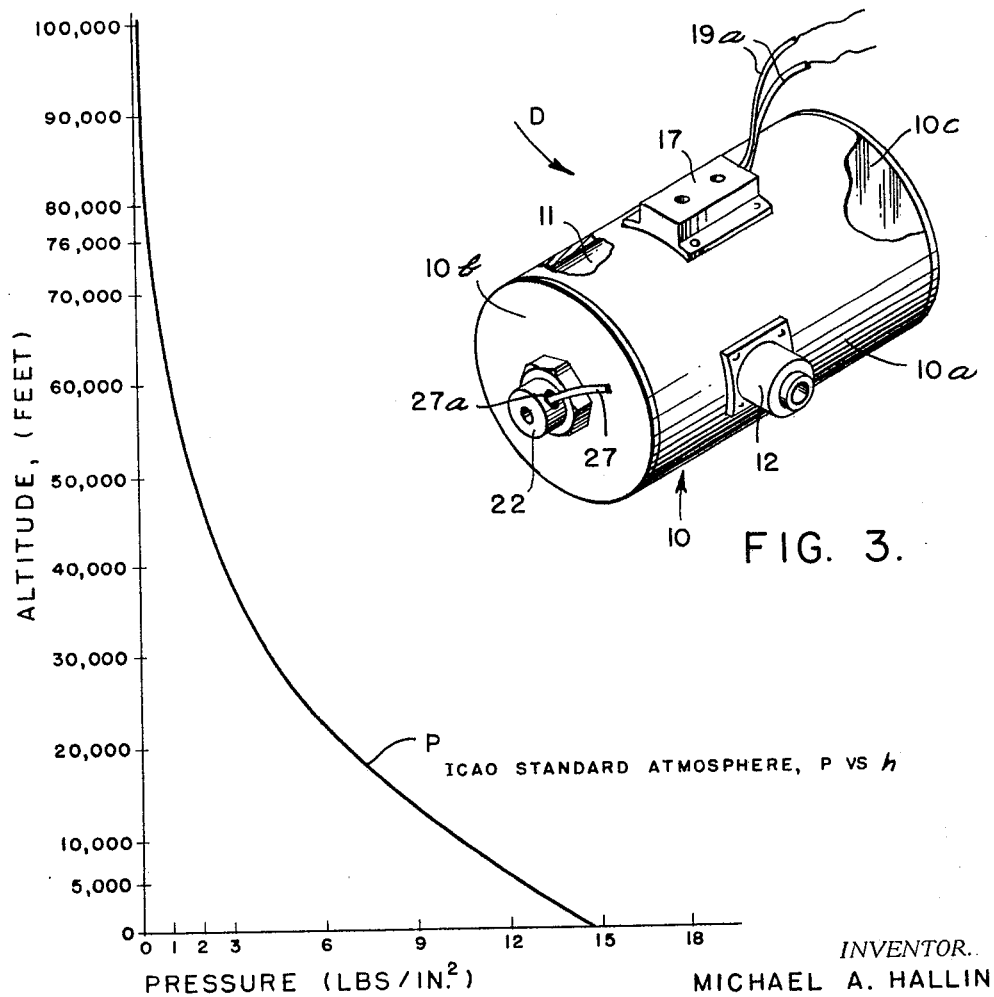
FIG. 3.
FIG. 2.
INVENTOR.
MICHAEL A. HALLING
BY
P. H. Fiehl
ATTORNEY.

July 25, 1967

M. A. HALLING 3,332,642

SUMMIT SENSING GUIDANCE INITIATION DEVICE

Filed July 28, 1965

INVENTOR.
MICHAEL A. HALLING

BY
P. H. Fisht
ATTORNEY.

United States Patent Office 3,332,642
Patented July 25, 1967

3,332,642
SUMMIT SENSING GUIDANCE INITIATION
DEVICE
Michael A. Halling, China Lake, Calif., assignor to the
United States of America as represented by the Secretary of the Navy
Filed July 28, 1965, Ser. No. 475,625
1 Claim. (Cl. 244—3.15)

ABSTRACT OF THE DISCLOSURE

The present invention relates generally to an electrical circuit switch actuating device and more particularly to a device to be employed in missiles of the type normally launched through the well-known loft-bombing technique along an arcuate trajectory extending from a launch point, through an apogee, and toward a target located at a point near the earths' surface, and function to actuate an electrical switch in response to changes in barometric pressures encountered as the missile is caused to pass through the apogee of the trajectory and descend to a lower altitude.

---

The invention described herein may be manufactured and used by or for the Government of the United States of America for governmental purposes without the payment of any royalties thereon or therefor.

In the field of guided missiles, particularly in instances where a given missile is of a type which is to be guided by means employing a passive terminal guidance system, it is desirable that the missile be launched ballistically with guidance being initiated at an optimum point located along the missile's trajectory, in order to achieve maximum range and effective target acquisition. Such a point will normally occur along the missile's trajectory after the missile has passed through an apogee, i.e., the summit of the ballistic trajectory, and has descended to an optimum altitude and achieved a desired attitude, with respect to a selected target. Generally speaking, the missile must approach the target for some period of time sufficient for permitting the missile to close on the target and acquire guidance signals as they are emitted from the target, while yet maintaining a proper attitude at an altitude sufficient for reaching a preselected target, when guidance is ultimately initiated, and reacquiring the target in the event the target is lost. Consequently, the missile should be permitted to fall from the apogee, along a ballistic trajectory, before guidance is initiated, in order to avoid acquisition of spurious guidance or homing signals, while yet permitting guidance to be imposed while the missile is at an altitude and in an attitude for acquiring and maintaining the homing signals and proceeding to the target.

Since missiles of the aforedescribed type possess utility in air-launched operations, an aircraft pilot may have airspeed, altitude and angle of launch computed for him. However, generally the optimum trajectory will not be known, due to the fact that the pilot may be required to approach a selected target at unpredictable altitudes and airspeeds and may be required to launch the missile at unpredictable ranges. Therefore, the weapon must possess the capability of being effectively launched along various ballistic trajectories which are selected at random and possess apogees dictated by parameters existing at the time of launch.

In attempting to solve this problem, several techniques have been proposed, including the use of fixed-time and fixed-altitude devices, for closing an electrical power circuit to the missile's guidance system. However, since launch parameters will necessarily vary, due to varying operative conditions, devices employing fixed-time and/or fixed altitude modes of operation unduly limit the effectiveness of the missile. Consequently, known systems have not satisfied existing needs.

Therefore, it is the purpose of the instant invention to provide practical means capable of closing an electrical circuit in response to barometric conditions encountered by a missile as it is ballistically launched and caused to proceed along any randomly selected trajectory through a resulting fortuitous apogee.

An object of the instant invention is to provide within a passive forward-looking, target-seeking missile, means for closing an electrical power circuit for a guidance system, as provided therefor, at an optimum point along a randomly selected trajectory as the missile approaches a selected target from a fortuitous apogee located therealong.

Another object is to provide a pressure-responsive device for use in airborne missiles adapted to close an electrical circuit at a point located along a trajectory where barometric pressure is increased to a preselected magnitude over the barometric pressure found at the apogee of the missile's trajectory.

Still another object is to provide a switch actuation means for activating an electrical circuit employed within a guidance system disposed within a missile of the type adapted to be launched along a randomly selected ballistic trajectory and through a resulting fortuitous apogee, with the guidance thereof to be initiated in response to an establishment of a barometric pressure differential found between the fortuitous apogee and a point randomly located along the terminal portion of the trajectory.

Other objects, advantages and novel features of the invention will become apparent from the following detailed description of the invention when considered in conjunction with the accompanying drawings wherein:

FIG. 1 comprises a schematic view of an air-launched missile, of a type employing the device of the instant invention, as the missile is delivered along a trajectory extending from a point-of-launch to a selected target;

FIG. 2 is a graphic view of a curve representing changes of barometric pressures encountered by the missile of FIG. 1 as the missile descends from the apogee of the trajectory;

FIG. 3 is a perspective view of the device of the instant invention;

Figure 4:
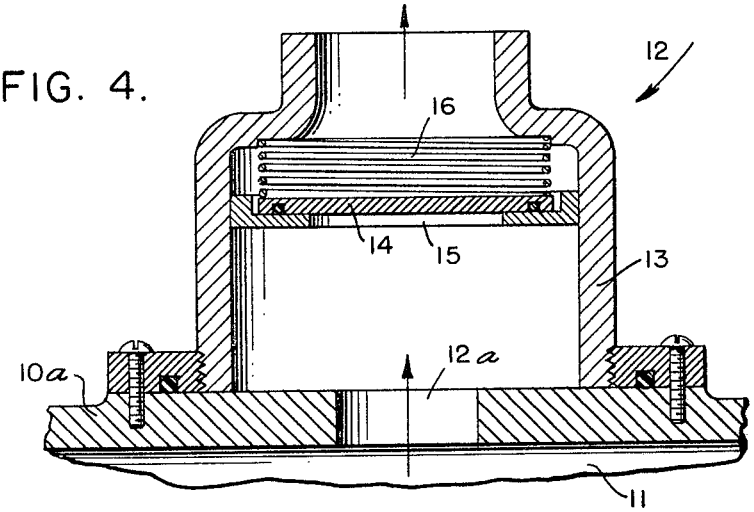
Figure 5:
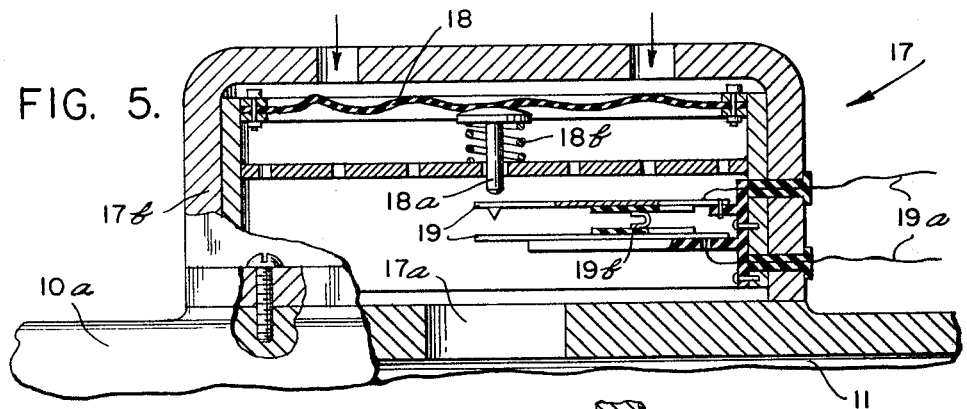
Figure 6:
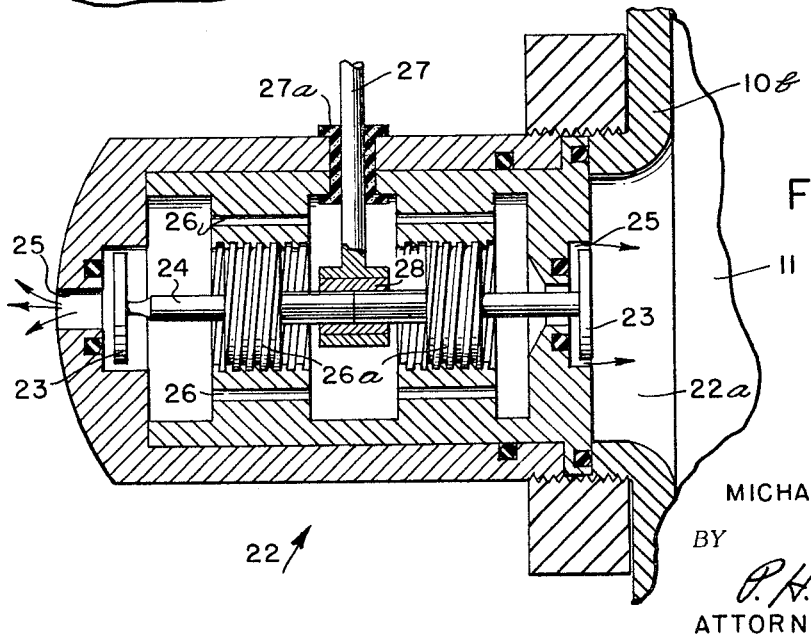
Figure 7:
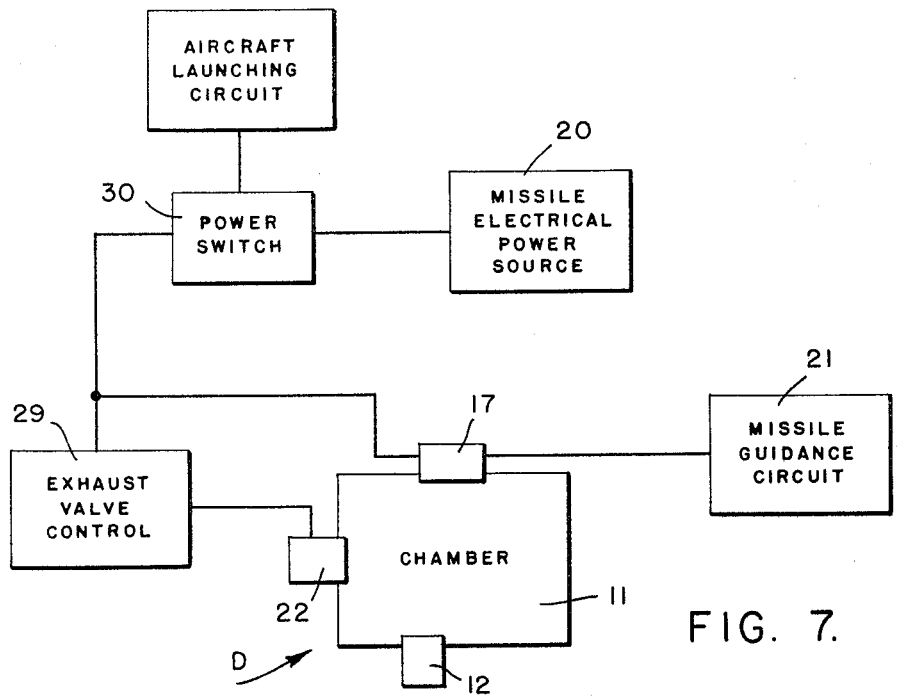
Figure 8:
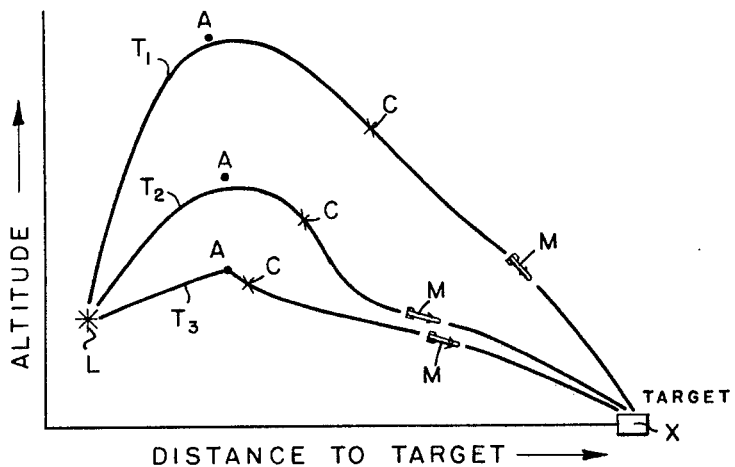

FIGS. 4 and 6 comprise cross-section views of valve means representing general types of valves which may be employed in the device of the instant invention;

FIG. 5 is a cross-section view of a type of pressure-responsive switch which may be employed in the device of the instant invention;

FIG. 7 comprises a diagrammatic view of a type of system within which the device of the instant invention may be operatively mounted; and FIG. 8 comprises a diagrammatic view illustrating various trajectories which represent a family of trajectories that may be followed by a missile employing the device of the instant invention, as well as points at which the device of the present invention may function.

Referring now to the drawings, wherein like reference characters designate like or corresponding parts throughout the several views, there is shown in FIG. 1 an air-launched missile M as it approaches a selected target X along the terminal portion of a selected trajectory T, extending from a point of launch, L through an apogee A, and toward the target X.

It is known that the properties of the earth's atmosphere will vary with changes in time, climate, position and latitude. However, "standard atmospheres" have been established for purposes of simplified comparative analysis. These established atmospheres are based on the equation of state of a perfect gas and may be computed for both the stratosphere and troposphere. A typical atmosphere established for 40 degrees north latitude is the well-known ICAO (International Civil Aviation Organization) Standard Atmosphere. Utilizing an ICAO Standard Atmosphere, changes in barometric pressure may be plotted against changes in altitude for establishing a curve P, FIG. 2. The curve P of FIG. 2 serves to illustrate the various changes in barometric pressure encountered by the missile M as it descends from the apogee A of the selected trajectory. It will be noted that changes in barometric pressure are of an increasing magnitude as the altitude is reduced to points occurring nearer the earth's surface. For example, note that at approximately 100,000 feet altitude the missile must descend approximately 24,000 feet in order to achieve a change of .33 p.s.i. (pounds per square inch), while at 5000 feet, the missile M need descend approximately only 713 feet in order to achieve a similar change in barometric pressure. It is this phenomenon which renders the device of the instant invention practical, since the device is intended to detect changes in barometric pressure between the apogee of a trajectory and some point occurring at a lower altitude along the trajectory in order to effect a closing of an electrical circuit, while the missile maintains a proper attitude near an optimum altitude for missile-guidance purposes. In other words, the descent required for effecting a barometric pressure change is less for a missile reaching an apogee located near the earth's surface than is required where the apogee is at a greater altitude.

Turning now to FIG. 3, the device of the present invention, generally designated D, comprises a hermetically sealed, welded housing 10, including an elongated tubular wall 10a and a pair of transversely aligned, oppositely disposed end walls 10b and 10c, which define within the housing 10 a pressure chamber 11. The housing 10 is provided with suitable means, not shown, adapted for mounting the housing 10 within the missile M in a manner such that the exterior surfaces of the housing 10 will be subjected to ambient barometric pressure, i.e., the various barometric pressures found along the missile's trajectory.

Mounted along the wall 10a is a one-way valve 12. The valve 12 is so designed as to allow pressure to escape from the chamber 11 through an opening 12a, FIG. 4, formed in the wall 10a, as the missile M is caused to ascend to an apogee, but to seal the chamber 11 against an introduction of pressure therethrough as the missile descends from the apogee. While numerous valves are presently available for performing this function, a valve of the spring-loaded type, as illustrated in FIG. 4, may be employed. Such a valve may comprise a sealed container 13 having disposed therein a thin sealing disk 14 aligned in sealing relationship with a valve exhaust port 15, and biasing means 16 for retaining the disk 14 in a seated and sealed position with respect to the port. The biasing means 16, as illustrated, includes a coil spring having a selected spring-constant sufficient for permitting pressures confined within the chamber 11 to escape, once a drop in exterior or ambient barometric pressure, i.e., the barometric pressure existing outside the chamber 11, is experienced. However, where the pressure confined within the chamber 11 is at a value lower than ambient barometric pressure, it is intended that the disk 14 remain seated within the container 13 to thus preclude a passage of atmosphere into the chamber 11, whereby a pressure differential is established across the valve 13.

The pressure differential thus established is utilized for actuating a barometric switch 17, FIG. 5, mounted along the wall 10a in communication with ambient barometric pressure and the pressure established within the chamber 11. The switch 17 is of any suitable design which will detect a pressure differential established thereacross and close an electrical switch in response thereto. For purposes of description, the switch 17 is illustrated, FIG. 5, as being a type which employs a displaceable and flexible diaphragm 18 suspended across an opening 17a formed in the wall 10a, to establish a hermetic seal between the chamber 11 and ambient atmosphere. The diaphragm is so designed as to permit it to deform and extend in response to a selected pressure differential, as the differential is caused to be established thereacross due to changes occurring in ambient barometric pressure. While the pressure differential selected for deforming the diaphragm may be of any suitable value which will satisfy existing needs, a differential of approximately .33 p.s.i. has been suggested as being satisfactory for meeting most operative requirements. In order to close an electrical circuit, there is mounted within a housing 17b, as provided for the switch 17, a pair of electrical contact points 19. The contact points 19 are so mounted to be operatively associated with the diaphragm 18, and are connected, through leads 19a, with the missile's electrical power source 20 and the missile's guidance system circuit 21, FIG. 7.

The contacts 19 normally are open and serve as a switch means for closing an electrical circuit between the source 20 of electrical power and the guidance system circuit 21 when the established pressure differential is of a predetermined magnitude, sufficient for extending the diaphragm 18 toward the chamber 11. This is achieved by transmitting diaphragm displacement to at least one of the contact points 19 through a suitable linkage, such as, for example, a spring-biased plunger 18a, which is operatively mounted for reciprocation between the diaphragm 18 and the contacts 19. As a practical matter, the plunger 18a may be spring-biased against vibration-induced displacement by a coil spring 18b, while the contacts 19 are maintained in a mutually separated state by a suitable leaf-spring 19b for purposes of precluding an accidental closing of the circuit between guidance system 21 and the power source 20. However, it is to be noted that the springs 18b and 19b establish a resistance which must be accounted for when selecting a diaphragm which will respond to a preselected differential.

In practice, the missile M must be transported by an aircraft to the vicinity of the target prior to a launching thereof. Consequently it is necessary to provide the device D with means for avoiding an undesired actuation of the device D. Therefore, within the wall 10b there is mounted a normally open aperture or relief valve 22 of a suitable type which is to be closed at the time of the missile's launching for sealing the chamber 11 against an introduction of ambient barometric pressures. The valve 22 is mounted across an opening 22a formed in the wall 10b and serves to accommodate an aircraft-transport of the missile M, by maintaining the chamber 11 in an unsealed condition prior to a launching of the missile M from the transporting aircraft. It will be appreciated that prior to a launching of the missile M, the pressures established within the chamber 11 must be equalized with the existing ambient barometric pressures, in order to maintain an insignificant pressure differential across the switch 17, to thus maintain the device D in an inoperative state. However, where the device D is to be actuated under operative conditions, the valve 22 must function to seal the chamber 11 so that a pressure differential may be established across the switch 17. Therefore, the valve 22 must be of a type capable of being sealed or closed on command at approximately the time of the missile's launch. Such a command may be derived from an acceleration of the missile, as it is launched, or from other sources and means, such as a launching signal for the missile launching circuit. Valves suitable for fulfilling the requirements of the instant invention are of various types presently available on the market. However, for purposes of describing the invention, a valve of the general type illustrated in FIG. 6 may be employed. Generally speaking, the valve 22 must, when open, accommodate a two-way passage of pressures therethrough in order to prevent an establishment of a pressure differential across the diaphragm 18 of the switch 17, while the transpointing aircraft performs various maneuvers. However, the valve 22 must also possess a capability for sealing the chamber against the introduction of ambient barometric pressure to the chamber 11 when closed at the missile's launching. To achieve this function, the valve 22 may include a pair of displaceable sealing disks 23 mounted at opposite ends of a reciprocating shaft 24, which extends longitudinally through the valve 22 with the disks 23 being adapted to be seated in valve-openings 25. The openings 25 may be connected by conduits or passageways 26, which extend through the valve 22 and terminate at the openings 25 and serve to relieve pressures established in chamber 11. Secured to the shaft 24 is a pair of threaded worm-gear members 26a which are mounted for rotation within the valve housing and mated with threaded portions thereof. An actuating rod 27 is proxided to extend through a resilient or sponge-like packing or seal 27a, seated within the valve's housing, and is coupled with the shaft 24 through a conventional splined coupling member 28. For the sake of convenience in assembly, the shaft 24 may comprise two portions brought into longitudinal alignment and abutting relationship within coupling 28. In any event, the openings 25 are operatively sealed through a pivotal displacement of the rod 27 which serves to rotate the shaft 24 for thereby driving the worm-gears 26. A driving of the worm-gears 26 serves to impart reciprocal displacement to the shaft 26 in a direction for seating the disks 23 in a sealing relationship within the openings 25. The pitch of worm-gears 26 is such that only slight rotation is required to effect a seating of the disks 23. Therefore, only a slight pivotal displacement of rod 27 is required for sealing the valve 22 and, consequently, the chamber 11. The resiliency of the packing 27a accommodates the required displacement.

Displacement of the rod 27 may be imposed in any desired manner exemplary of which is through an exhaust valve control means 29, FIG. 7, which may include various operative means not shown. Such means may comprise an electrical solenoid and mechanical linkages, which respond to missile acceleration, or, as preferred a pyrotechnic driven mechanical linkage operatively connected with a conventional squib-actuator, also not shown. Squib-actuators are of well-known design and normally include a gas driven piston, which will be displaced in response to an ignition of a pyrotechnic material. As illustrated, FIG. 7, a firing signal voltage, acquired from the source 20, may be applied to the control means 29 through a power switch 30, which is closed in response to a launching of the missile.

In order to provide for an understanding of the operation of the device, reference is now made particularly to FIGS. 1, 3 and 8. Prior to a launching of the missile M along its trajectory, the actuating rod 27 is so positioned as to accommodate an exchange of barometric pressure through the valve 22 as the transporting aircraft performs various maneuvers at various altitudes. However, where the missile 17 is to be delivered in a loft-bombing mode, the aircraft will approach the target at a lower altitude and then initiate a climbing maneuver. At a launch point L, as determined by target range and aircraft release altitude and attitude, the missile M is ejected or launched from the aircraft so that it is caused to proceed along some chosen ballistic trajectory having a resulting fortuitous apogee. At the time of the missile launch, the actuating rod 27 is displaced for closing the valve 22 and for causing the chamber 11 to be sealed against an introduction of barometric pressures. As the missile M ascends toward the apogee of the trajectory, designated A, the valve 12 allows pressure to escape from the chamber 11, due to the fact that ambient barometric pressure is undergoing a reduction in magnitude, so that the pressure within the chamber 11 is caused to be equalized with ambient pressure.

Therefore, no pressure differential will be established across the switch 17. At the apogee, or point A, a minimum barometric pressure will be encountered, consequently, the pressure established in the chamber 11 will be a minimum value. As the missile continues along the trajectory, e.g., proceeds along the terminal portion of the trajectory, it is caused to fall from the apogee, whereupon, ambient barometric pressure will undergo an increasing change in value. Since ambient barometric pressure will now be excluded from the chamber 11, a pressure having a value established at the apogee is retained within the chamber 11. Therefore, a pressure differential of an increasing magnitude is established across the switch 17. Once the pressure differential attains a predetermined value, say .33 p.s.i., the switch 17 will be actuated for thereby closing a circuit between an electrical power source and the guidance system.

For purposes of illustration, the point along the trajectory at which the preselected differential is established has been designated C. It will be appreciated that where a steep trajectory, such as that designated $T_1$, FIG. 8, which permits the missile M to attain greater altitude, has been chosen, the missile M must descend through a greater distance for establishing the selected differential than will be the case where a shallow trajectory, such as as those designated $T_2$ and $T_3$, are chosen. This results from the fact that borametric pressure changes occur more rapidly as the missile descends to points located nearer the earth's surface, as illustrated in FIG. 2.

In view of the foregoing, it is to be understood that actuation of the switch 17 will be delayed until the missile M has passed through an apogee of any selected trajectory along which it is caused to proceed, and that a further delay in actuation will be established in accordance with the ultimate altitude attained by the missile. Hence, for all practical purposes, actuation of the switch 17 will be effected near the optimum point along the missile's trajectory, regardless of the configuration of the chosen trajectory or the altitude of the resulting apogee.

Obviously many modifications and variations of the present invention are possible in the light of the above teachings. It is therefore to be understood that within the scope of the appended claim the invention may be practiced otherwise than as specifically described.

What is claimed is:

In a missile of the type adapted to be launched for travel in an upward trajectory in the atmosphere to an apogee and thence downward in a terminal portion to a target and including an electric switch adapted to be actuated in said terminal portion, the improvements, comprising;
 (a) a closed chamber carried by the missile adapted to be pressurized by ambient atmospheric pressure,
 (b) a normally open valve for communicating ambient atmosphere with the chamber, and means for closing same at a point-of-launch,
 (c) a normally closed one-way valve for communicating the chamber with the atmosphere, adapted to open between point-of-launch and apogee to reduce chamber pressure and finally establish apogee pressure within the chamber, and
 (d) a pressure responsive device adapted to be operated by a predetermined difference in pressure between apogee pressure and ambient atmospheric pressure during said terminal portion adapted to actuate said switch.

References Cited

UNITED STATES PATENTS 2,940,392   6/1960   Loren et al. _____ 102—70.?

BENJAMIN A. BORCHELT, *Primary Examiner.*

M. F. HUBLER, *Assistant Examiner.*